May 18, 1965  H. NAGEL  3,183,779
CUTTER DEVICE FOR MANUFACTURING T OR L SLOTS
Filed July 5, 1961  3 Sheets-Sheet 1
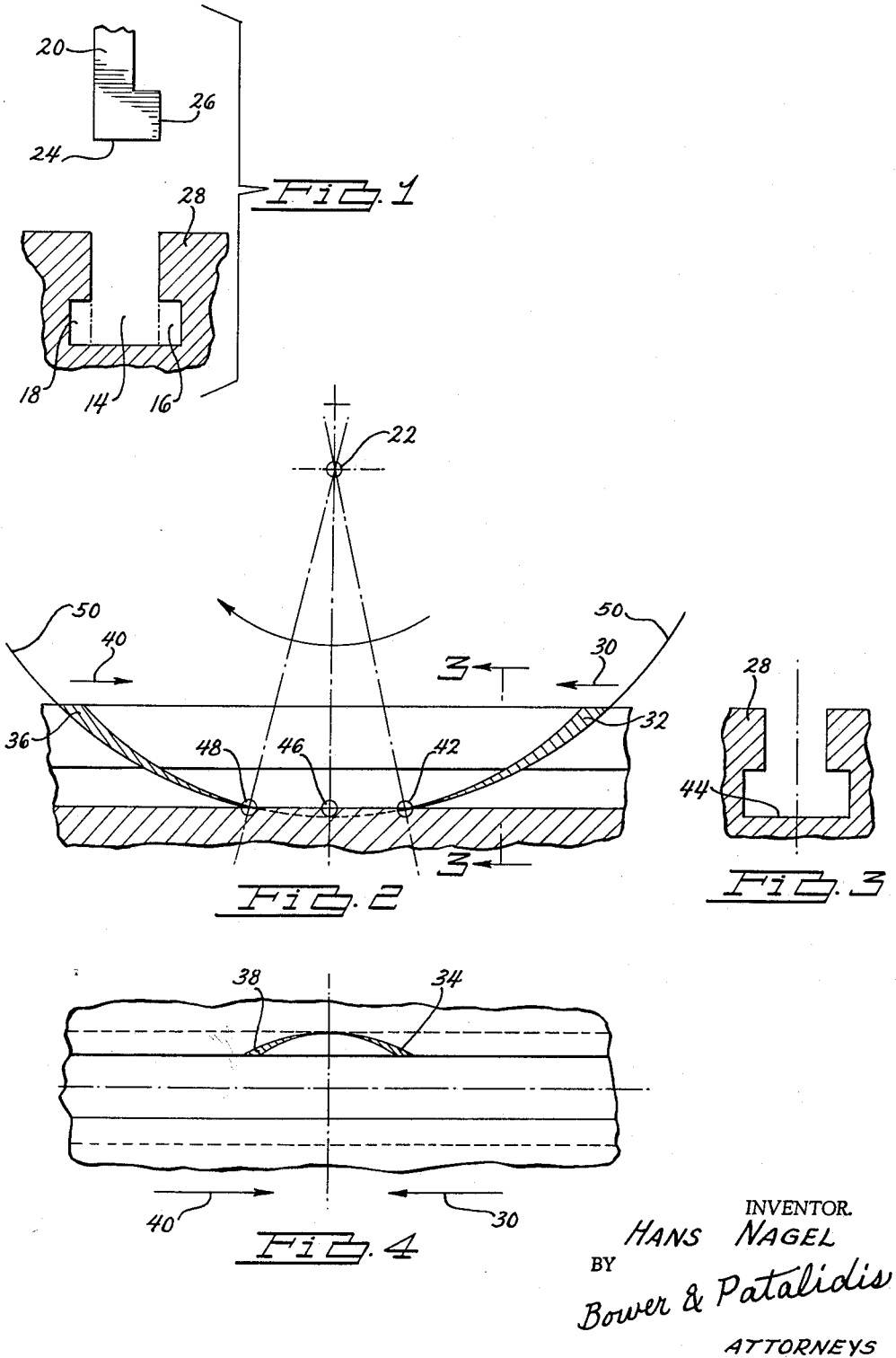
INVENTOR.
HANS NAGEL
BY
Bower & Patalidis
ATTORNEYS May 18, 1965    H. NAGEL    3,183,779
CUTTER DEVICE FOR MANUFACTURING T OR L SLOTS
Filed July 5, 1961    3 Sheets-Sheet 2
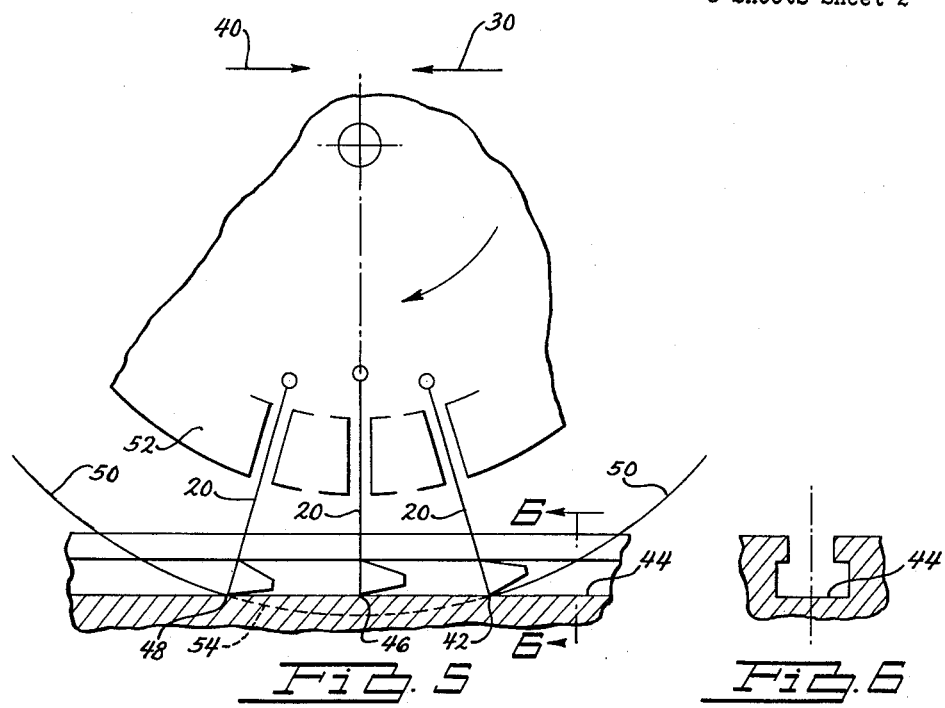
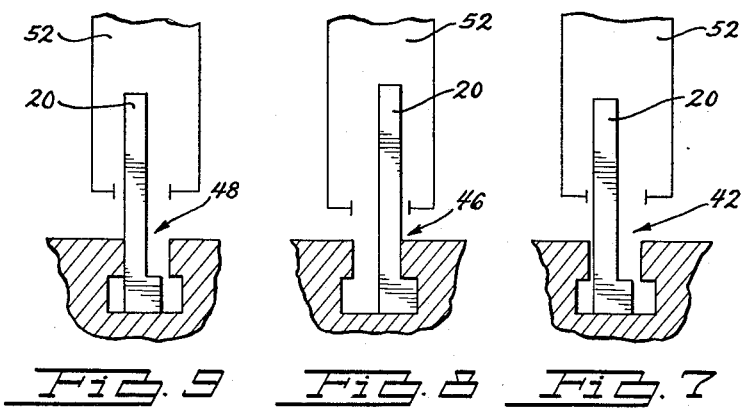
INVENTOR.
HANS NAGEL
BY
Bower & Patalidis
ATTORNEYS May 18, 1965 H. NAGEL 3,183,779
CUTTER DEVICE FOR MANUFACTURING T OR L SLOTS
Filed July 5, 1961 3 Sheets-Sheet 3
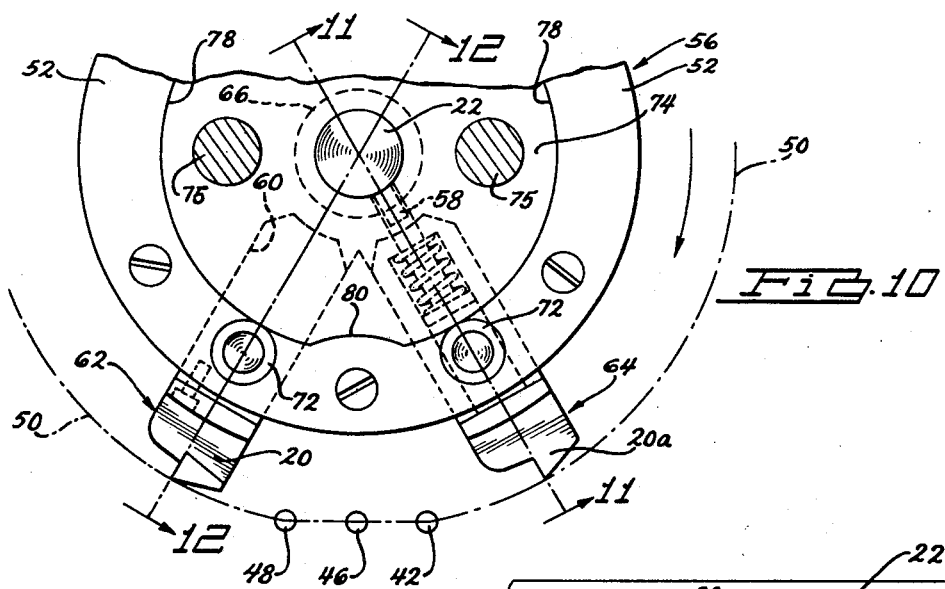

United States Patent Office 3,183,779
Patented May 18, 1965

3,183,779
CUTTER DEVICE FOR MANUFACTURING
T OR L SLOTS
Hans Nagel, Gingen (Fils), Germany, assignor to Ex-Cell-O G.m.b.H., Eislingen (Fils), Wurttemberg, Germany
Filed July 5, 1961, Ser. No. 122,026
2 Claims. (Cl. 90—11)

This invention relates to new and useful improvements by way of milling with a rotating cutter, and particularly to the device to accomplish the same. The present method of forming T- or L-slots in material requires two operations. The first operation is to mill a straight sided slot to a finished depth with a tool such as a side mill, shank or end mill, etc. The second operation is to mill the T or L recessed portion into the material using a T-slot cutter. This method is expensive and time consuming, requiring two different milling cutters and two different set-ups.

An important objective of this invention is to provide a single mill cutter head which can produce T- or L-slots in one operation and with one setup.

Another object of the present invention is to provide a mill cutter head which will allow the cutter tool to travel in a plane constituting the bottom of the T- or L-slot while a part of the tool is moving perpendicular with the path of rotary travel removing part of the material to produce the T- or L-slot portion.

One subject of the invention is to have a mill cutter head so constructed that each cutter tool is reciprocated when at the bottom of the T- or L-slot in such a manner as to move in a plane parallel to the said bottom of the T- or L-slot for a short distance, and while said tool is so reciprocated, it is caused to be moved in a direction parallel with its axis of rotation and remove material from the workpiece, thus forming a portion of the T- or L-slot.

Another object of the invention is to provide a mill cutter head so that it has a series of cutters so constructed that each cutter tool is reciprocated when at the bottom of the T- or L-slot in such a manner as to move in a plane parallel to the said bottom of the T- or L-slot for a short distance, and having every other tool so constructed that while it is reciprocated in said manner it will be caused to move in a direction parallel with its axis of rotation and remove material from the workpiece, thus forming a portion of the T- or L-slot.

Another object of the invention is to provide an L-slot mill cutter head so that it has a series of cutters so constructed that each cutter tool is reciprocated when at the bottom of the L-slot in such a manner as to move in a plane parallel to the bottom of said L-slot for a short distance, and having every other cutter tool so constructed that while it is reciprocated in said manner it will be caused to move in a direction parallel with the axis of rotation of its head and remove material from the workpiece, thus forming a portion of the L-slot.

Another object of the invention is to provide a T-slot mill cutter head so that it has a series of cutters so constructed that each cutter tool is reciprocated, when at the bottom of the T-slot, in such a manner as to move in a plane parallel to the bottom of said T-slot for a short distance, and having every other cutter tool so constructed that while it is reciprocated in said manner it will be caused to move in a direction parallel with the axis of rotation of its head and remove material from the workpiece, thus forming one side of the T-slot. The cutting tools before these will move in a manner to remove material from the workpiece for the other side of the T-slot. This mill cutter head could be arranged to have cutters in series of threes, with the third cutter merely reciprocating and removing material for the slot but not for either side of the T-slot.

Also, the objectives of the present invention include the provision of a structure capable of accomplishing the above objectives with a minimum of material cost and fabricating expense and, at the same time, being composed of simple and ruggedly constructed elements which are very reliable in operation.

Other objects and advantages of the invention will be apparent from the following detailed description and claims taken in connection with the accompanying drawings which form part of the instant specifications, and which are to be read in conjunction therewith and in which like reference numerals are used to indicate like parts in various views.

FIG. 1 is a cross sectional end view of a T-slot and an end view of a milling tool.

FIG. 2 is a schematic side view showing the milling tool movement.

FIG. 3 is a cross sectional end view of a T-slot per line 3—3 of FIG. 2.

FIG. 4 is a plan view of a T-slot showing the milling tool movement.

FIG. 5 is a side elevation schematic view of various vertical milling tool positions during cutting.

FIG. 6 is a cross sectional end view of a T-slot per line 6—6 of FIG. 5.

FIGS. 7 to 9 are cross section end views of T-slots per FIG. 6 showing the transverse movement of the milling tool when positioned as indicated in FIG. 5.

FIG. 10 is a side elevation view of the milling tool showing the vertical generating cam surface and the milling tool follower.

FIG. 11 is a cross sectional view of a milling tool per line 11—11 in FIG. 10.

FIG. 12 is a cross sectional end view of a slot milling tool per line 12—12 in FIG. 10.

In FIG. 1 is shown the end view of a standard T-slot which may conventionally be machined by a side milling cutter removing material forming area 14, and a T-slot milling cutter removing material to form areas 16 and 18. If an L-slot is required, area 14 may be formed as previously explained, and then a T-slot milling cutter may be used to remove the material to form either area 16 or 18, thus forming the appropriate L-shape. My new device uses milling tool 20 which is rotating about the axis of rotation shaft 22 as shown in FIG. 10. Referring to FIG. 1, the milling tool 20 has a side cutting edge 24 which removes the material to form area 14, and a slot cutting edge 26 which removes the material to form area 16. Another milling tool 20 (not shown) similar to the one shown, but reversed, will have its slot cutting edge 26 remove material to form area 18. The removal of material is shown schematically in FIGS. 2 and 4 when the milling tools 20 are rotating clockwise about shaft 22 as viewed in FIGS. 2 and 10. If the relative movement between the milling tool 20 and the workpiece 28 is in the direction of arrow 30, it is called climb milling.

Material removed during climb milling is represented by area 32 for cutting edge 24, and by area 34 for cutting edge 26. If the relative movement between the milling tool 20 and the workpiece 28 is in the direction of arrow 40, it is called conventional milling. Material removed during conventional milling is represented by area 36 for cutter edge 24, and by area 38 for cutting edge 26. The material removed by this description will give us an L-slot, and if a T-slot is required, the same statements would be true for the removal of the material on the opposite side of the slot to complete the T-slot. As viewed in FIGS. 1 through 4, when climb milling, the side cutting edge 24 of milling tool 20 contacts the workpiece 28 and removes material during movement through area 32, thus forming area 14. When the cutting edge 24 reaches position 42, which is located at the T-slot bottom 44, it starts moving radially towards shaft 22 and axially into the workpiece 28. The milling tool 20 continues to rotate and as it moves from position 42 to position 46, it continues to move radially towards shaft 22, generating the cutting edge 24 in a straight line, thus forming a flat surface which is T-slot bottom 44; and as it moves from position 46 to 48, it moves radially away from shaft 22 but still generating the cutting edge 24 in a straight line, thus continuing to form a flat surface 44. From position 48 is continues rotation about shaft 22 at constant distance generating a circular path 50 as seen in FIGS. 2 and 10.

Simultaneously with the radial movement of milling tool 20 with respect to shaft 22, from position 42 to position 46, there is axial movement with the slot cutting edge 26 being moved into the workpiece 28 and removing material during movement through area 34 forming area 16 or 18, depending on which side of milling tool 20 the cutting edge 26 is placed. From position 46 to position 48 there is an axial movement with the slot cutting edge 26 being moved out from the workpiece 28 to its original position, thus being in position to be withdrawn through the area 14.

In conventional milling, which has relative movement between the milling tools 20 and the workpiece 28 as indicated by arrow, this will be similar to the climb milling but will be doing its cutting while cutting edges 24 and 26 are passing through areas 36 and 38 respectively.

The radial locations of the milling tool 20 at positions 42, 46 and 48 are indicated in FIG. 5, and the axial locations of the milling tool 20 at positions 42, 46 and 48 are indicated in FIGS. 7, 8 and 9. Milling tools 20 are housed in cutter body 52 and are guided in their radial movement as they generate the side cutting edge 24 in a path from position 42 to position 48, so as to mill the T-slot bottom 44 as a flat surface. The milling cutters 20 are controlled by a cam between position 42 and 48 which causes them to generate a straight line path, without this cam, the milling cutter 20 would follow dotted circle 54. FIGS. 7, 8 and 9 show the axial location of milling tool 20 at positions 42, 46 and 48 respectively.

When the milling tool 20 is being used in climb milling and reaches position 42, as seen in FIGS. 1, 2 and 7, it has passed through area 32 removing material to form a groove as defined by area 14. As the tool 20 continues to rotate from position 42 to position 46, the side cutting edge 24 moves in a straight line due to a cam which causes the tool to move radially towards the shaft 22. At the same time, the tool 20, as seen in FIGS. 1, 4 and 8, moves axially through area 34 removing material to form a slot as defined by either area 16 or 18. The rotation continues by moving the tool 20 from position 46 to position 48 with the cutting edge 24 moving in the straight line path as its tool 20 is moved by the cam in a movement radially away from shaft 22. At the same time, the tool 20, as seen in FIGS. 4 and 9, is moved axially through area 38 and ends up at position 48 so that the tool can leave the groove defined by area 14 without interference with side walls. Conventional milling would be similar to this but the slot area 16 or 18 would be milled first as the tool travels through area 38, and the groove area 14 would be milled second as the tool travels circular path 50 after leaving position 48.

A milling device 56 which is capable of preforming this method of L- or T-slot milling is shown in FIGS. 10–12. The milling device consists of a cutter body 52 which is firmly connected to shaft 22 for rotation with it by keys 58 and securing means not shown. The cutter body 52 is provided with radial openings 60 for guiding tool holders 62 or 64 carrying tools 20 and 20a respectively radially and/or axially with respect to shaft 22. Cutter body 52 surrounds a bushing 66 which is mounted on shaft 22 as shown in FIGS. 11 and 12. Milling tools 20 and 20a are moved radially with respect to shaft 22 by the system shown in FIGS. 10, 11 and 12. The cutter body 52 has a pair of concentric openings 68 for each tool 20 or 20a. A pin 70 is associated with each pair of openings 68 parallel with the shaft 22, and passes through a tool holder 62 or 64 and has one cam follower 72 connected to each end. The cam followers 72 follow the cam surfaces of non-rotating cams 74 which are separated from the cutter body 52 by means of a ball bearing 76. The non-rotating cams 74 are secured to shaft 22 supports, not shown, by support rods 75, as shown in FIG. 10. This is one method of holding cams 74 stationary; however, there are many other ways of accomplishing this.

The operation of tool holder 64 is as follows: The followers 72 run on cam surface 78 of non-rotating cams 74, allowing milling tool 20a to follow and travel in circular path 50 until the milling tool 20a reaches position 42. At this position cam follower 72 follows concave cam surface 80 which is so shaped as to generate tool 20a in a straight path from position 42 through position 46 to position 48, then the milling tool 20a will continue along path 50 as follower 72 is again acting on cam surface 78. Tool holder 64 is journaled to pin 70. The holder 64 has a bore 82 which receives bolt 84 with head 86. The bolt 84 is connected to bushing 66 and journalled in tool holder 64 with spring 88 acting from head 86 on holder 64 tending to move it towards the shaft 22.

The operation of tool holder 62 is as follows: The followers 72 run on the non-rotating cams 74 the same as described for tool holder 64.

The holder 62, which is journalled to pin 70, has a bore 82' housing a spring 88' tending to move the holder towards the shaft 22 and axially along the pin 70. The rate of axial movement of the holder 62 is controlled by the incline of guide member 90.

The holder 62 has a bore 92 to receive one end of the guide 90, the other end being secured in cutter body 52. The free lateral movement of the holder 62 with respect to the guide member 90 is allowed by roller member 94. Guide member 90 may be adjustably mounted in cutter body 52 by such means as slots, for example.

Referring milling tool 20 of FIG. 12 to milling tool 20 of FIG. 1, we would be forming area 16. Therefore, to form area 18 we would need a tool holder similar to 62 as shown in FIG. 12, with the milling tool 20 reversed and bores 82' and 92 along with their accompanying parts acting in a manner to move slot cutting edge 26 into workpiece 28 to move material forming area 18.

The milling device 56 can be arranged in such a manner that there will be a series of tool holders around its periphery to remove material forming the T- or L-slot. An arrangement for an L-slot device could be a tool such as shown in FIG. 11, and followed by a tool such as shown in FIG. 12 or, if the opposite L-slot were needed, the tool shown in FIG. 12 would be reversed. The milling device would have several pairs, for example, 3 or 4.

An arrangement for a T-slot device could be a tool such as shown in FIG. 11, followed by a tool such as shown in FIG. 12, which would be followed by a tool similar to FIG. 12 but reversed. The milling device would have several groups of 3's, for example, 3 groups. Another arrangement for a T-slot device could be a tool such as shown in FIG. 12, followed by a tool similar to FIG. 12 but reversed. This milling device would have several pairs, for example, 3 or 4.

The arrangements here listed are not given to limit the method of arrangement of the holders, nor are they so intended, but they are merely given to show specific embodiments that can be utilized to practice the disclosed invention.

I claim:
1. An L-slot cutter device comprising,
 (a) a rotatable shaft,
 (b) a cutter holder rotatable with said shaft,
 (c) at least one L-shaped cutting tool in said cutter holder and extending radially with respect to said shaft,
 (d) said cutting tool movably secured in the cutter device, a cam member within said cutter device located between said rotatable shaft and cutter holder and held stationary relative thereto,
 (e) a guide means within the cutter device,
 (f) said cam member moving the cutting tool radially toward and away from the shaft at a synchronized time during each revolution, and
 (g) said guide means moving the tool in an axially reciprocating movement during said radial movement.
2. A T-slot cutter device comprising,
 (a) a rotatable shaft,
 (b) a cutter holder rotatable with said shaft,
 (c) at least two oppositely faced L-shaped cutting tools in said cutter holder and extending radially with respect to said shaft,
 (d) said cutting tools movably secured in the cutter device,
 (e) a stationary cam member secured adjacent to the rotatable shaft and cutter holder,
 (f) guide means within the cutter holder acting with each cutting tool,
 (g) said cam member moving the cutting tools radially toward and away from the shaft at a synchronized time during each revolution,
 (h) said guide means moving the cutter tools in an axially reciprocating movement from a starting position during said radial movement, and
 (i) the first tool moving in one direction from the starting position and the second tool moving in the other direction.

References Cited by the Examiner
UNITED STATES PATENTS

| | | | |
|---|---|---|---|
| 1,058,441 | 4/13 | Kelley | 144—85 |
| 1,637,745 | 8/27 | Gosper | 144—85 |
| 2,424,524 | 7/47 | Weimer | 77—4 |
| 2,547,915 | 4/51 | Leonard. | |
| 2,716,360 | 8/55 | Cogsdill. | |
| 3,079,671 | 3/63 | Payne | 29—96 |

WILLIAM W. DYER, Jr., *Primary Examiner.*
J. SPENCER OVERHOLSER, *Examiner.*